(12) United States Patent
Sugiura

(10) Patent No.: US 6,324,302 B1
(45) Date of Patent: Nov. 27, 2001

(54) METHOD AND A SYSTEM FOR SUBSTANTIALLY ELIMINATING ERRONEOUSLY RECOGNIZED NON-SOLID LINES

(75) Inventor: Yuko Sugiura, Kamga (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/086,420

(22) Filed: May 29, 1998

(30) Foreign Application Priority Data

May 30, 1997 (JP) .................................................. 9-141355

(51) Int. Cl.[7] .................................................. G06K 9/34
(52) U.S. Cl. ............................................ 382/173; 382/202
(58) Field of Search ............................... 382/202, 191, 382/173, 128, 192, 264, 309

(56) References Cited

U.S. PATENT DOCUMENTS

| | | | |
|---|---|---|---|
| 4,138,662 | * | 2/1979 | Shimoyama ...................... 340/146.3 |
| 4,403,340 | * | 9/1983 | Kumpf et al. ......................... 382/48 |
| 5,594,815 | * | 1/1997 | Fast et al. ............................ 382/254 |
| 5,621,743 | | 4/1997 | Tomisawa ............................. 371/30 |
| 5,751,850 | * | 5/1998 | Rindtorff ............................. 382/178 |
| 5,896,464 | * | 4/1999 | Horiuchi et al. ..................... 382/178 |
| 5,987,171 | * | 11/1999 | Wang .................................. 382/173 |

FOREIGN PATENT DOCUMENTS 7-230525   8/1995 (JP) .

* cited by examiner

Primary Examiner—Yon J. Couso
(74) Attorney, Agent, or Firm—Knoble & Yoshida, LLC

(57) ABSTRACT

Certain characters and symbols are often erroneously recognized as non-solid periodic lines such as dotted lines and single chain lines. The erroneous recognition stems out from recognition criteria which are generally based upon the characteristics of the line elements such as height, width and a distance between the elements. To substantially eliminate the erroneous recognition, one preferred embodiment according to the current invention substantially eliminates erroneous candidates for non-solid periodic lines based upon a distance to adjacent text characters.

23 Claims, 14 Drawing Sheets

METHOD AND A SYSTEM FOR SUBSTANTIALLY ELIMINATING ERRONEOUSLY RECOGNIZED NON-SOLID LINES

FIELD OF THE INVENTION

The current invention is generally related to a method of and a system for substantially eliminating an error in determining a non-solid periodic line, and more particularly related to a method of and a system for substantially eliminating some of the candidates for non-solid periodic lines based upon a distance to adjacent text characters.

BACKGROUND OF THE INVENTION

In order to recognize non-solid lines in text image, prior attempts included various criteria for distinguishing non-solid lines from solid lines. FIG. 1 illustrates an text image which contains text characters such as "Claim." In addition, the text image also contain a vertical solid and dotted (non-solid) lines in the Y direction as well as a horizontal dotted line in the X direction. Initially, text characters are separated from these lines. The lines are then further grouped into solid lines and non-solid lines.

Referring to FIG. 2, in general, non-solid lines are contrasted to solid lines and have broken portions. However, the broken portions of the non-solid lines are not necessarily repeated patterns. In the following, the non-solid periodic lines are defined as a plurality of periodically alternating portions or repeated patterns which are located along one axis. For example, the non-solid periodic lines include a dotted line, a single chain line and a double chain line. In these examples, a predetermined pattern of alternating portions is repeated in the above defined non-solid periodic lines.

To ascertain non-solid periodic lines, prior attempts such as disclosed in Japanese Laid Publication 7-230525 include criteria such as the height, width, distance and length of the lines. For example, referring to FIG. 3A, each of repeated or periodic elements is measured for its height and width. Additionally, the distance between these repeated elements as well as the length of the non-solid line are used to ascertain whether or not a line is truly non-solid and periodic. One way to ascertain is to compare the above measured values against a set of predetermined threshold values. Another way is to determine the distribution or deviation of the above measured values and compare the deviation to a predetermined range with respect to a predetermined value. Yet another way is to determine a ratio of the above measured values and compare the ratio to a predetermined ratio value. For a skewed non-solid line, referring to FIG. 3B, in addition to a horizontal H distance between the repeated portions, a vertical distance V is also considered. Any of the above described measured values is combined for the comparison. In any of the above described comparisons, the predetermined values are particular to a specific non-solid periodic line.

Despite the above described criteria, the prior attempts still fail to correctly distinguish certain repeated text characters from non-solid periodic lines. For example, referring back to FIG. 1, three rows of characters "l," "i" and "," may be respectively considered as a non-solid line in the Y direction based upon the above described criteria. Since the above discussed criteria focus upon the predetermined characteristics of the lines per se, a repeated portion of the text characters is not necessarily distinguished from the non-solid periodic lines.

SUMMARY OF THE INVENTION

In order to solve the above and other problems, according to a first aspect of the current invention, a method of determining non-solid periodic line, including the steps of: a) inputting image data including continuous elements; b) determining circumscribing areas each enclosing a continuous element; c) selecting candidates for a non-solid line having one of predetermined periodic patterns based upon the circumscribing areas; and d) eliminating some of the candidates based upon a predetermined relation to circumscribing areas containing text characters adjacent to those of the candidates.

According to a second aspect of the current invention, a system for determining non-solid periodic line, includes: an input unit for inputting image data including continuous elements; a circumscribing unit operationally connected to the input unit for determining circumscribing areas each enclosing a continuous element; a non-solid line selection unit operationally connected to the circumscribing unit for selecting candidates for a non-solid line having one of predetermined periodic patterns based upon the circumscribing areas; and a non-solid periodic line unit operationally connected to the non-solid line selection unit for eliminating some of the candidates based upon a predetermined relation to circumscribing areas containing text characters adjacent to those of the candidates.

According to a third aspect of the current invention, a computer program stored on a medium for executing computer instructions so as to determine non-solid periodic line in text image data, the computer program performing the steps of: a) inputting the text image data including continuous elements; b) determining circumscribing areas each enclosing a continuous element; c) selecting candidates for a non-solid line having one of predetermined periodic patterns based upon the circumscribing areas; and d) eliminating some of the candidates based upon a predetermined relation to circumscribing areas containing text characters adjacent to those of the candidates.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 3A illustrates each of repeated or periodic elements in a straight non-solid periodic line while

DETAILED DESCRIPTION OF THE PREFERRED EMBODIMENT(S)

Figure 4:
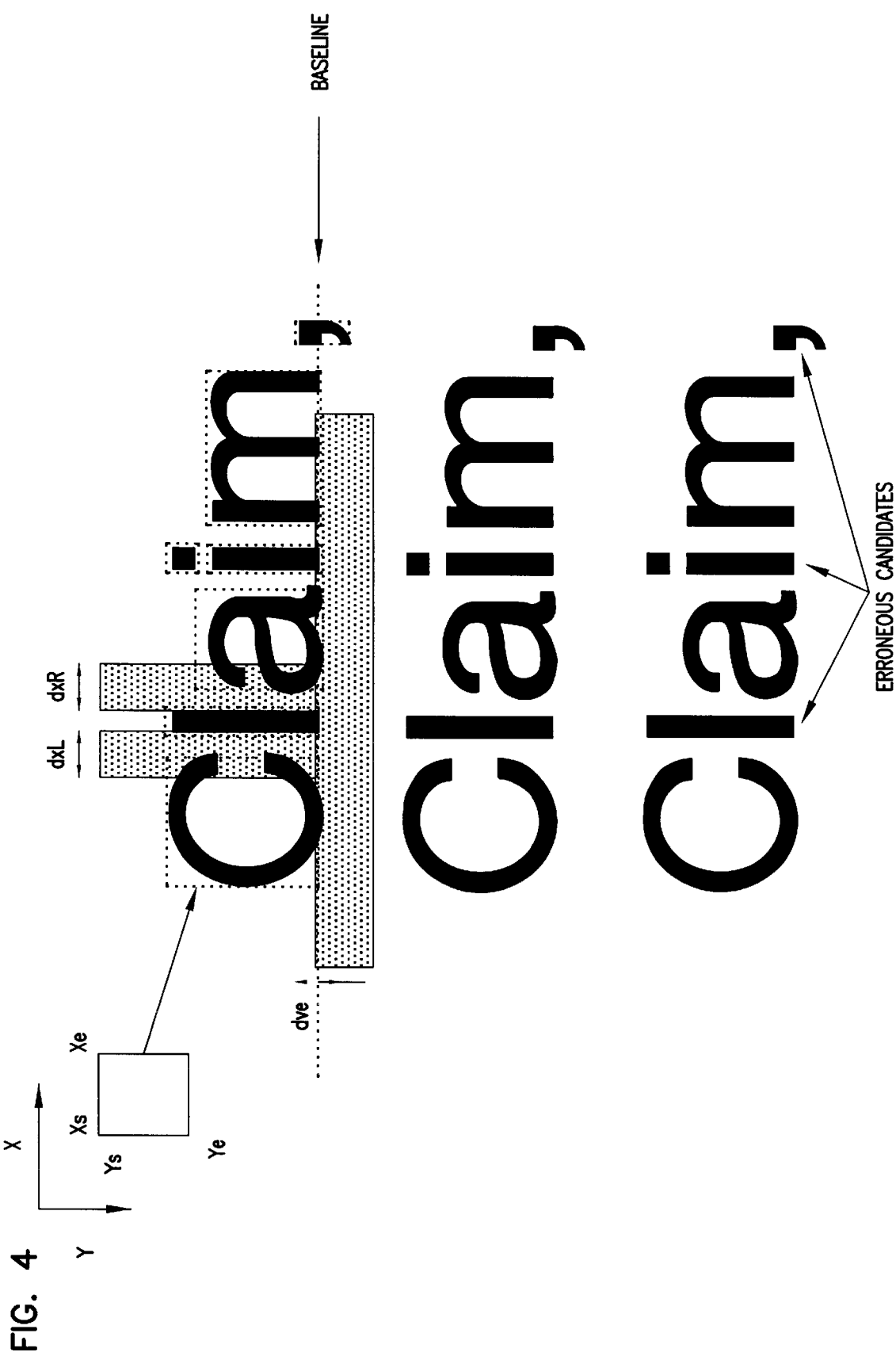
FIG. 4 illustrates a relationship of a non-solid line candidate to adjacently located elements.

Referring now to the drawings, wherein like reference numerals designate corresponding structure throughout the views, and referring in particular to FIG. 4, in order to substantially eliminate errors in detecting non-solid periodic lines, a text image is divided into minimally circumscribing rectangles which are shown in dotted lines. In general, based upon the minimally circumscribing rectangles, characters are separated from lines. Lines usually have a width that is less than a predetermined certain value. For a vertical line in the Y direction, the width of the line is in the X direction. For a horizontal line in the X direction, the width of the line is in the Y direction. According to the above described character-line separation criterion, some of the characters such as "l" and "i" are not necessarily recognized as characters and are erroneously considered as non-solid line candidates since rows of these characters can be a part of vertical non-solid lines. For example, vertically aligned characters, "l" s may be erroneously considered as a dotted line while those of "i" s may be considered a single chain line. In addition, vertically aligned rows of certain symbols such as periods and commas are also erroneously considered as non-solid lines.

Still referring to FIG. 4, to substantially eliminate the above described erroneously recognized non-solid line candidates or quasi non-solid line candidates, one preferred method according to the current invention relies upon a relationship to adjacently located elements. In one preferred method, each of the non-solid line candidates such as "l" is further examined in the following three aspects. Firstly, the bottom corner Ye of the minimal circumscribing rectangles of the adjacent characters "C" and "a" are both within a first predetermined range dye from a baseline of the non-solid line candidate "l." Secondly, it is determined whether the upper right corner Xe of the minimal circumscribing rectangle of the left adjacent character "C" is within a second predetermined range dxL of the non-solid line candidate. Thirdly, by the same token, it is determined whether the upper left corner Xs of the minimal circumscribing rectangle of the right adjacent character "a" is within a third predetermined range dxR of the non-solid line candidate. A set of the second and third predetermined range values dxL and dxR depends upon a font type, a character and a font size, and the the two values are not necessarily the same for the same character. When the above three conditions are met for each of the non-solid line elements, the non-solid line candidate is eliminated since it is erroneously recognized as a non-solid line.

Similarly, other non-solid line candidates such as characters "i" and symbols "," are also examined based upon the above described criteria according to the current invention. The character "i" and a symbol such as ":" are divided into two elements by minimally circumscribing the top part and the bottom part of the character, and the two components are separately examined. For these characters and symbols having more than one component, the non-solid line candidate is eliminated when the two components independently satisfy the above described three relational conditions.

Figure 5:
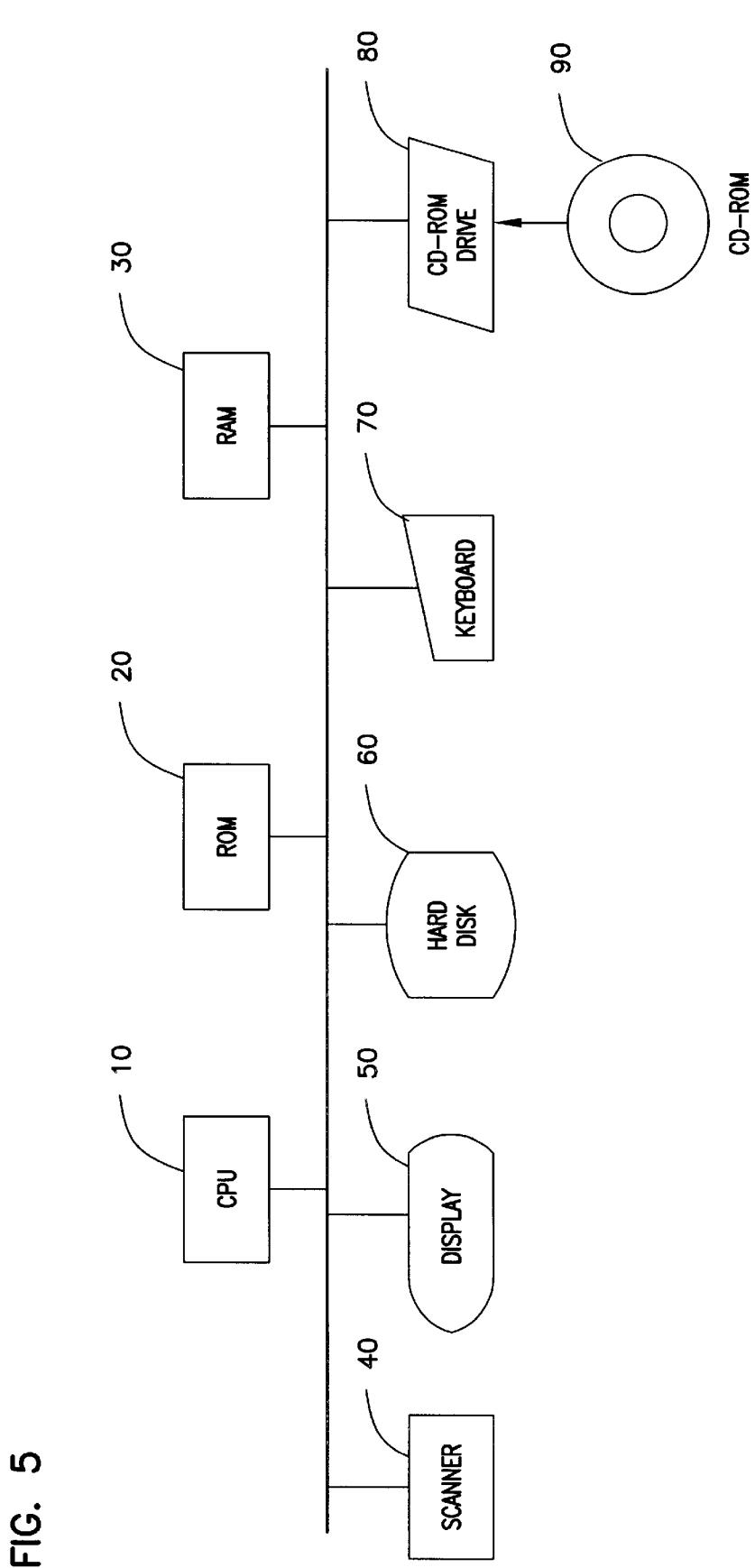
FIG. 5 is a block diagram illustrating one preferred embodiment of the system for substantially eliminating erroneously recognized non-solid line candidates according to the current invention.

Referring to FIG. 5, one preferred embodiment of the system for substantially eliminating erroneously recognized non-solid lines according to the current invention generally includes a processor such as a central processing (CPU) unit 10, primary memory units such as a random access memory (RAM) 30 and a read only memory (ROM) 20, secondary memory units such as a hard disk unit 60 and a compact disk read only memory (CD-ROM) 90 and a CD-ROM drive 80, input units such as a keyboard 70 and a scanner 40 as well as an output unit such as a display monitor 50. The preferred embodiment inputs text image data via the scanner 40 or one of the secondary memory units 60 or 90 and processes the text image data by running software in the RAM 30 for the CPU 10. The results are optionally displayed on the display unit 50.

Figure 6:
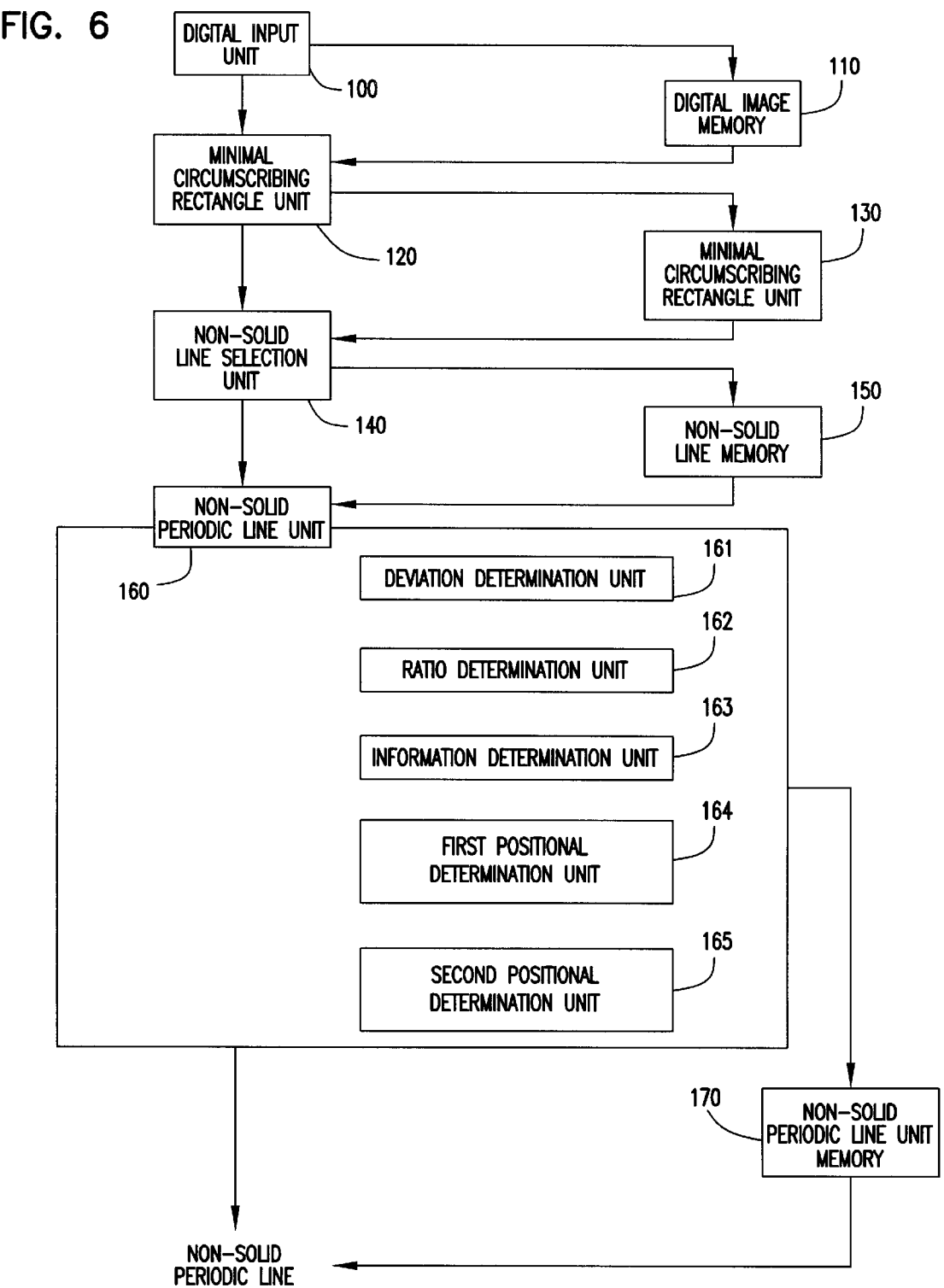
FIG. 6 is a block diagram illustrating a second preferred embodiment of the system for substantially eliminating erroneously recognized non-solid line candidates according to the current invention.

Now referring to FIG. 6, a second preferred embodiment of the system for substantially eliminating erroneously recognized non-solid lines according to the current invention generally includes a digital input unit 100 such as a scanner for inputting image data, a digital image memory 110 for storing the image data, a minimal circumscribing rectangle unit 120 for minimally circumscribing an area containing a character/line element, a minimal circumscribing rectangle memory 130 for storing the minimal circumscribing rectangle areas, a non-solid line selection unit 140 for selecting son-solid line candidates based upon the minimal circumscribing rectangle areas, a non-solid line memory 150 for storing the non-solid line candidates, a non-solid periodic line unit 160 for determining non-solid periodic lines among the non-solid line candidates and a non-solid line memory 170 for storing the non-solid periodic lines.

Still referring to FIG. 6, the non-solid periodic line unit 160 in the second preferred embodiment according to the current invention further includes a deviation determination unit 161, a ratio determination unit 162, an information determination unit 163, a first distance determination unit 164 and a second distance determination unit 165. Any number of the above enumerated five units 161 through 165 is selectively activated to determine non-solid periodic lines among the non-solid line candidates so as to substantially eliminate erroneously recognized non-solid line candidates. As defined above, the non-solid periodic lines contain a plurality of periodically alternating solid and non-solid portions or repeated patterns which are located along one axis. For example, the non-solid periodic lines include a dotted line, a single chain line and a double chain line.

To determine non-solid periodic lines, the deviation determination unit 161 determines the range and deviation of measured values in height and width of the non-solid line candidates. In addition, a distance between the components of the non-solid line candidates is examined for its range and deviation. The deviation determination unit 161 further statistically processes the range and deviation and compares the statistical values with a predetermined set of range/deviation threshold values. Based upon the comparison, for example, if the statistical value is beyond the threshold value, the deviation determination unit 161 substantially eliminates erroneously recognized non-solid line candidates.

Similarly, the ratio determination unit 162 determines the ratio of a combination of the measured values in height, width and the element distance of the non-solid line candidates. The ratio determination unit 162 further statistically processes the ratio values and compares the statistical values with a predetermined set of ratio threshold values. Based upon the comparison, for example, if the statistical values are beyond the ratio threshold values, the ratio determination unit 162 substantially eliminates erroneously recognized non-solid line candidates.

The information determination unit 163 determines the ratio of solid and non-solid areas in the non-solid line candidates. For example, if the text image data has digital values (i.e., 0 or 1), the ratio of the number of 1's or 0's to a total number of the 1's (dark pixels) and 0's (white pixels) in a minimal circumscribing rectangle is used. Assuming that there are no errors such as skewing and smudging of the non-solid periodic lines, for each minimally circumscribed component of a non-solid line, the above described ratio of the 1's or dark pixel is approximately one. On the other hand, the above described ratio in minimally circumscribed text components generally does not have a value close to one. The information determination unit 163 further statistically processes the ratio values and compares the statistical values with a predetermined set of information ratio threshold values. Based upon the comparison, for example, if the statistical values are beyond the information ratio threshold values, the information determination unit 163 substantially eliminates erroneously recognized non-solid line candidates.

Lastly, the first and second positional determination units 164 and 165 respectively determine a positional relation between each non-solid line candidate and an adjacent characters. For example, the first positional determination unit 164 determines whether or not the non-solid line component in question is located within a predetermined range of distance from a character that is located left of the non-solid line component. The second positional determination unit 165 determines whether or not the non-solid line component in question is located within a predetermined range of distance from a character that is located right of the non-solid line component. If the non-solid line component is located within either of the predetermined threshold distance, the first and second positional determination units 164 and 165 substantially eliminate erroneously recognized non-solid line candidates.

As described to above, any combination of the units 161 through 165 is selectively activated for substantially eliminating erroneously recognized non-solid line candidates. After the activated units in the non-solid periodic line unit 160 substantially eliminate erroneously recognized non-solid line candidates, remaining non-solid line candidates are now considered as non-solid line periodic lines and outputted or stored in a non-solid periodic line memory 170.

Figure 7:
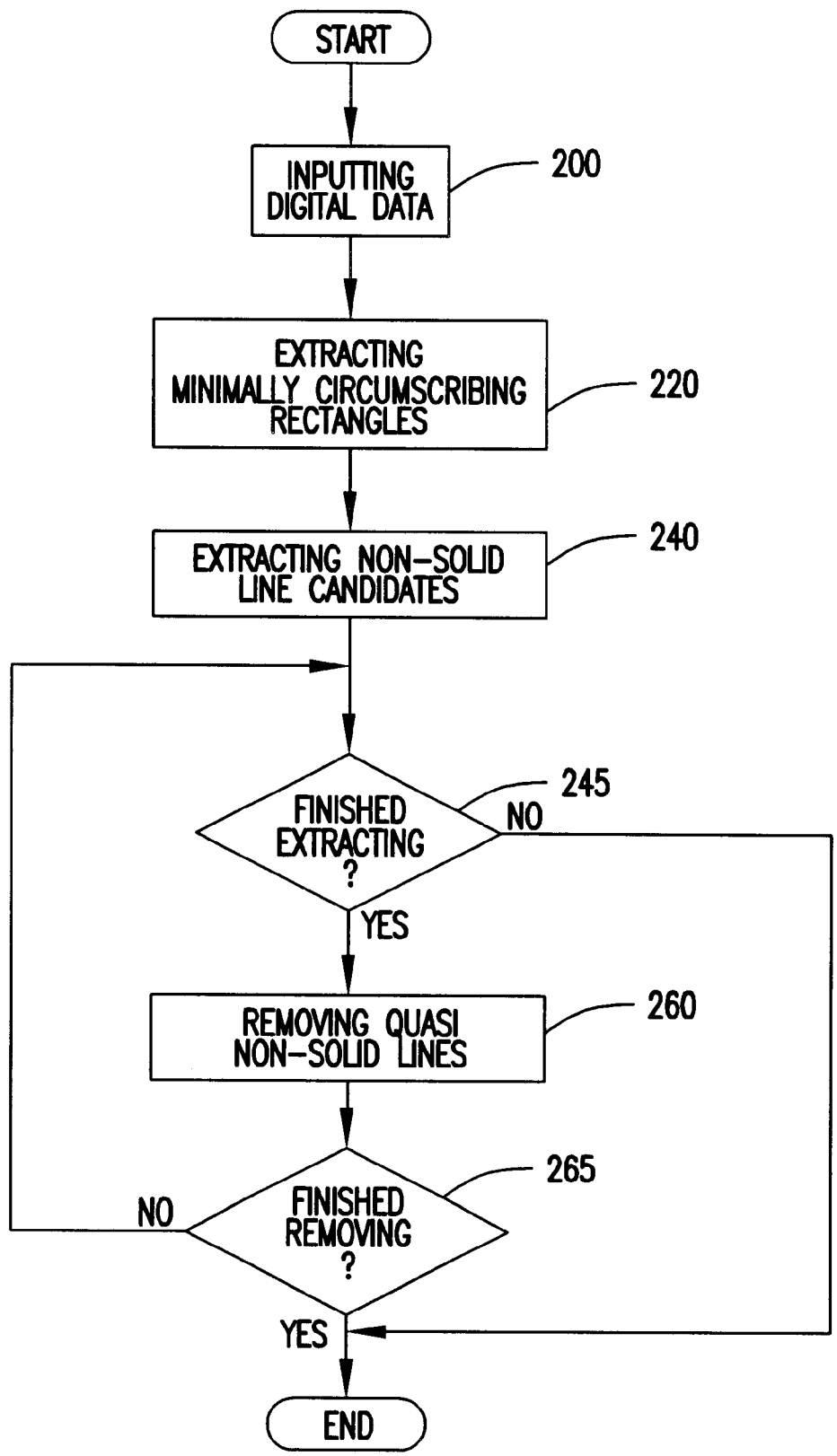
FIG. 7 is a flow chart illustrating steps involved in one preferred method of substantially eliminating erroneously recognized non-solid line candidates according to the current invention.

Now referring to FIG. 7, a flow chart illustrates general steps involved in a preferred method of substantially eliminating erroneously recognized non-solid line candidates or quasi non-solid lines according to the current invention. In a step 200, digital data for text image is inputted. Areas containing a continuous line portion or a continuous character portion are extracted and each marked by a minimal circumscribing rectangle in a step 220. Based upon the minimal circumscribing rectangles, non-solid line candidates are selected in a step 240. When there are non-solid line candidates in a step 245, for each candidate, a process is performed to determine whether the candidate is erroneously selected non-solid line so that quasi non-solid lines are substantially eliminated in a step 260. The above elimination step 160 is repeated until all of the candidates are examined as shown in a step 265.

Figure 8:
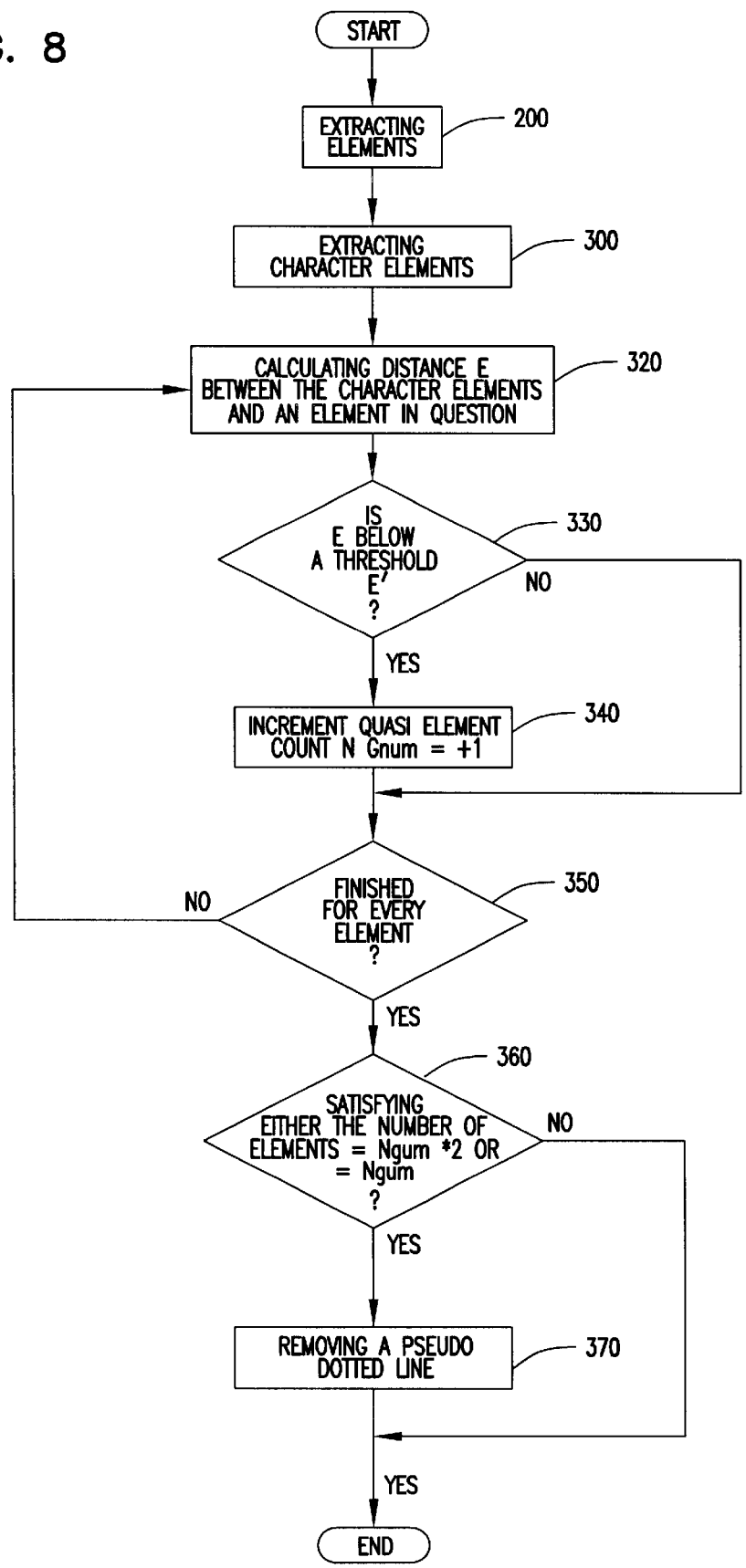
FIG. 8 is a flow chart further illustrating detailed steps involved in one preferred method of substantially eliminating erroneously recognized non-solid line candidates according to the current invention.

To further illustrate detailed steps of the substantially eliminating erroneously recognized non-solid lines, referring to FIG. 8, in a step 200, minimal circumscribing rectangles containing non-solid line components or elements are determined as non-solid line components. Similarly, minimal circumscribing rectangles containing text/character components or elements are determined in a step 300. In a step 320, a distance E between the character element and a non-solid line candidate in question is determined. It is determined in a step 330 whether the distance E is below a predetermined threshold distance value. In other words, if the non-solid line candidate is located within the predetermined distance E, a counter NGnum is incremented by one for each component in a step 340. On the other hand, if the non-solid line candidate is not located within the predetermined distance E, a counter NGnum is not incremental in a step 340. The steps 330 and 340 are repeated until every element is finished in a step 350. After every element is finished, it is determined whether the counter NGnum is equal to or a multiple of the number of components or elements in a step 360. In other words, if every component is located within the predetermined range of distance E, the non-solid line candidate is now determined to be a true non-solid line and is removed in a step 370.

Figure 9:
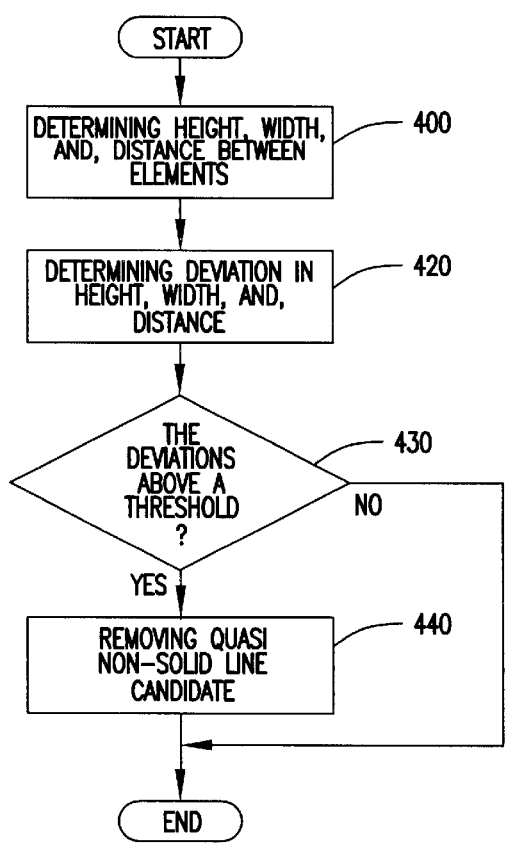
FIG. 9 is a flow chart further illustrating a first set of additional steps involved in one preferred method of substantially eliminating erroneously recognized non-solid line candidates according to the current invention.

In addition to the above described steps, the following processes may be combined in a preferred process of substantially eliminating erroneously recognized non-solid line candidates according to the current invention. Referring to FIG. 9, in a step 400, the height and width are determined for each non-solid line candidate, and a distance between minimal circumscribing rectangles is also determined. For each of these measures, deviation is determined in a step 420. The deviations are now each compared to a corresponding predetermined threshold value in a step 430. If the deviation is below the predetermined threshold value, the non-solid line candidate is now considered as a non-solid periodic line. On the other hand, if the deviation is above the predetermined threshold value, the non-solid line candidate is now removed in a step 440.

Figure 10:
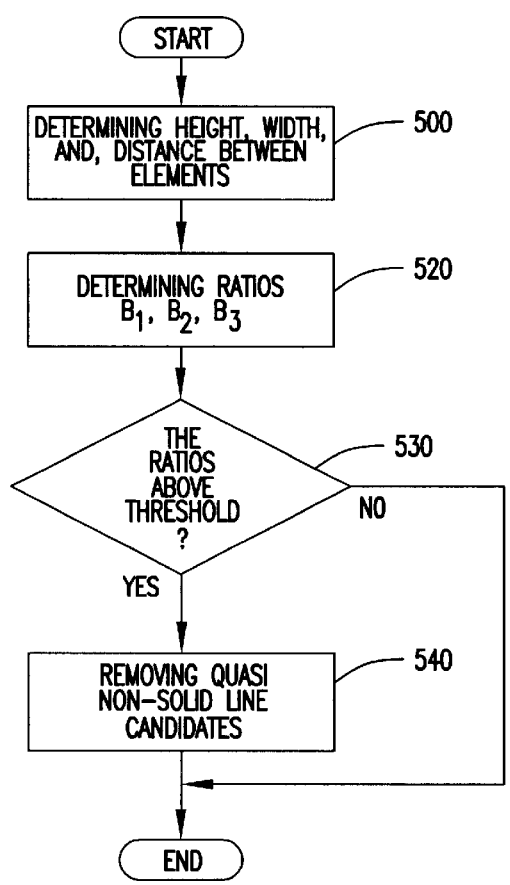
FIG. 10 is a flow chart further illustrating a second set of additional steps involved in one preferred method of substantially eliminating erroneously recognized non-solid line candidates according to the current invention.

Another set of additional steps are illustrated in a flow chart in FIG. 10. After a distance D between non-solid line elements as well as the height H and width W of non-solid line candidates are determined in a step 500, ratios among the height H, the width W and the distance D are calculated in a step 520. A first ratio B1 is defined to be D/w, while a second ratio B2 and a third ratio B3 are respectively defined to be W/H and D/H. These ratios B1, B2 and B3 are compared to a corresponding predetermined threshold value. If a ratio is below the predetermined threshold value, the non-solid line candidate is now considered as a non-solid periodic line. On the other hand, if the ratio is above the predetermined threshold value, the non-solid line candidate is now removed in a step 540.

Another set of additional steps are illustrated in a flow chart in FIG. 10. After a distance D between non-solid line elements as well as the height H and width W of non-solid line candidates are determined in a step 500, ratios among the height H, the width W and the distance D are calculated in a step 520. A first ratio B1 is defined to be D/w, while a second ratio B2 and a third ratio B3 are respectively defined to be W/H and D/H. These ratios B1, B2 and B3 are compared to a corresponding predetermined threshold value. If a ratio is below the predetermined threshold value, the non-solid line candidate is now considered as a non-solid periodic line. On the other hand, if the ratio is above the predetermined threshold value, the non-solid line candidate is now removed in a step 540.

Figure 1:
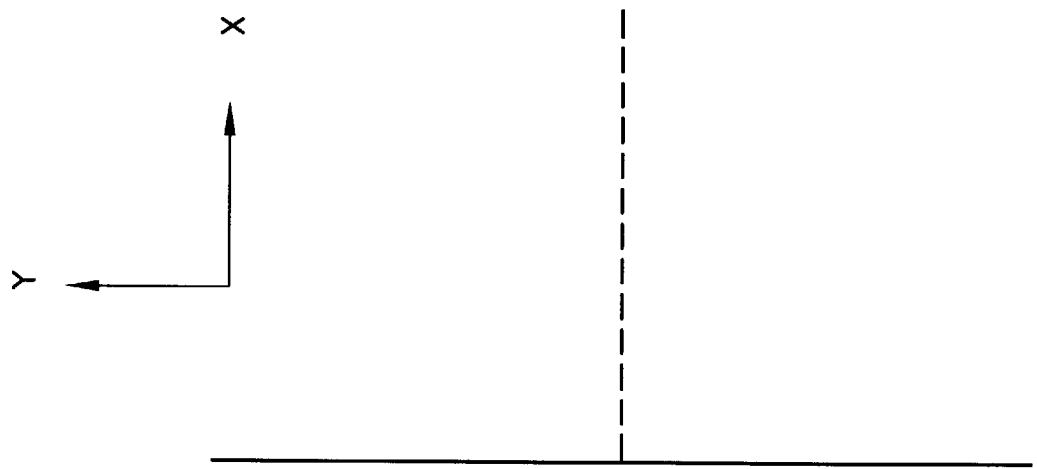
FIG. 1 illustrates an text image which contains text characters.
Figure 2:
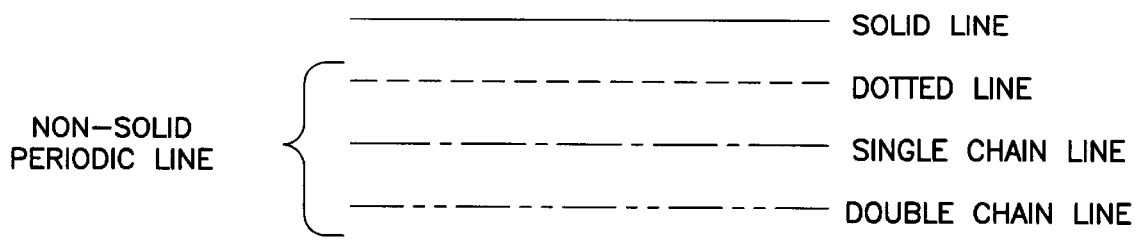
FIG. 2 illustrates a solid line and examples of non-solid periodic liens.
Figure 11:
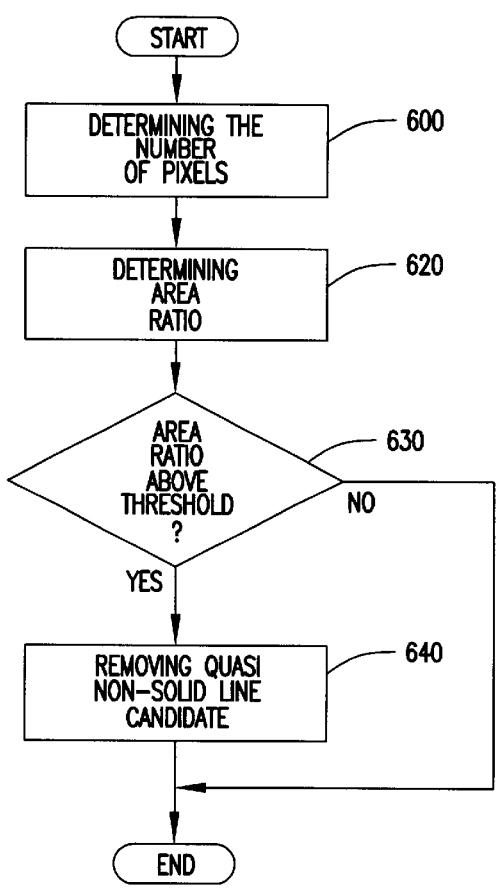
FIG. 11 is a flow chart further illustrating a third set of additional steps involved in one preferred method of substantially eliminating erroneously recognized non-solid line candidates according to the current invention.
Figure 3A:
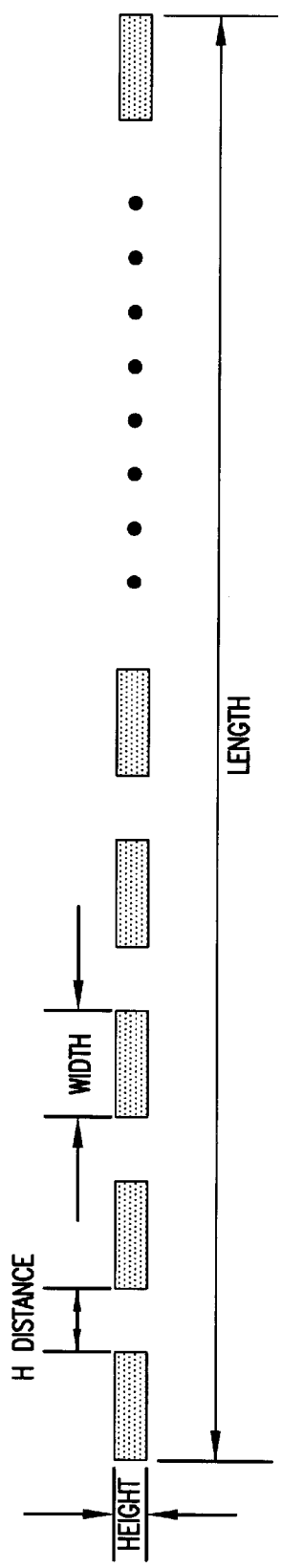
Figure 3B:
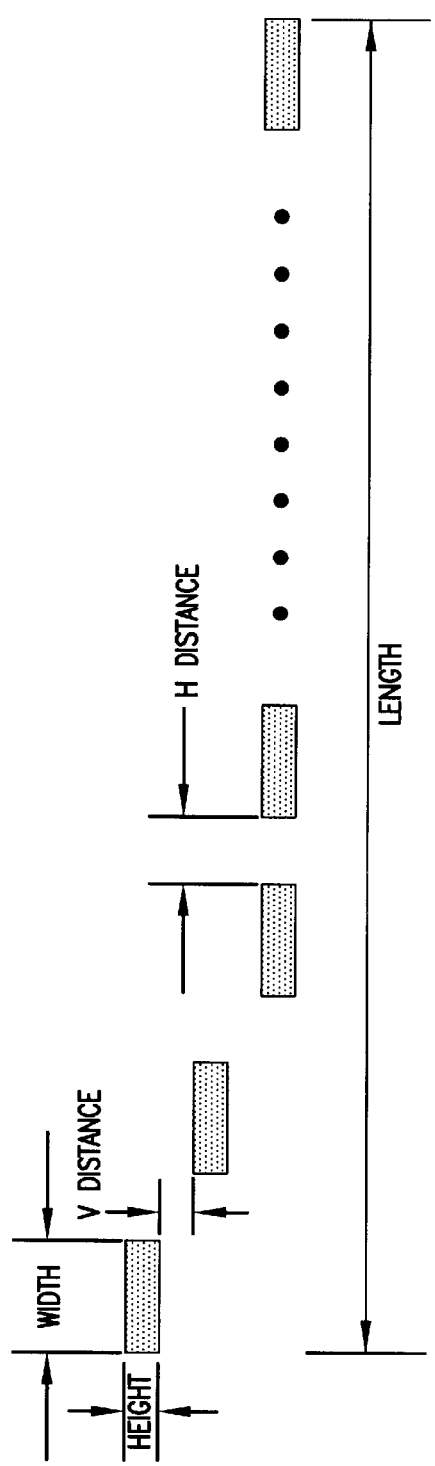
FIG. 3B illustrates the repeated elements in a skewed non-solid periodic line.

Yet another set of additional steps are illustrated in a flow chart in FIG. 11. After a number of a predetermined type of pixels such as dark pixels is counted in a minimal circumscribing rectangle in a step 600, a ratio between dark pixels and white pixels is determined in a step 620. For image data other than black-and-white, a ratio is defined for a predetermined set of ranges of values. If a ratio is substantially near the predetermined threshold value, the non-solid line candidate is now considered as a non-solid periodic line. For example, for a black-and-white dotted line, each of the non-solid line components has a ratio near one since each minimal circumscribing rectangle contains nearly all black pixels. On the other hand, if the ratio is not substantially near the predetermined threshold value, the non-solid line candidate is now removed in a step 640.

Figure 12:
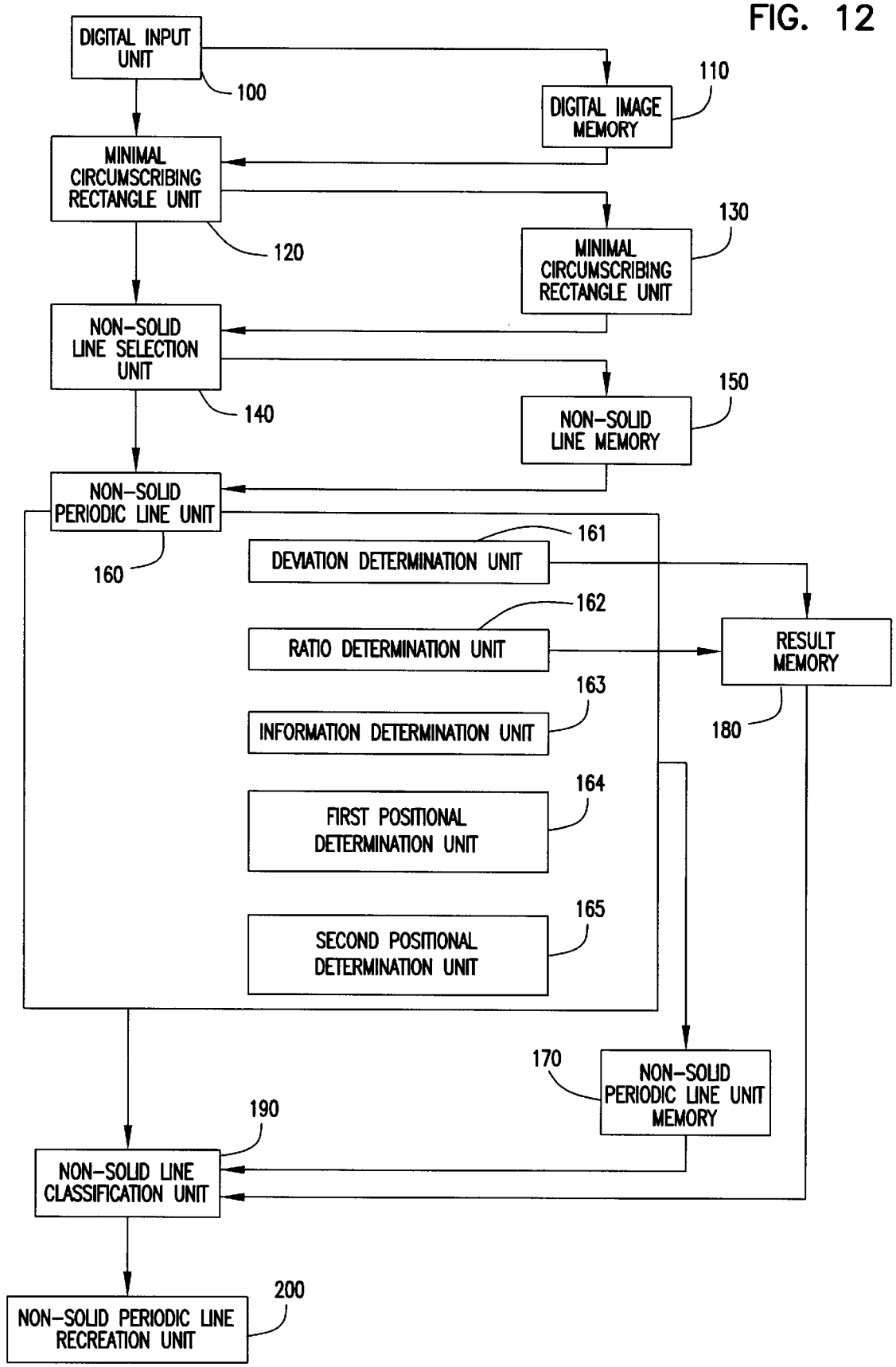
FIG. 12 is a block diagram illustrating a third preferred embodiment of the system for substantially eliminating erroneously recognized non-solid line candidates according to the current invention.

Referring to FIG. 12, a third preferred embodiment for substantially eliminating erroneously recognized non-solid line candidates includes units which are generally identical to the ones already described in reference to FIG. 6. However, the third preferred embodiment additionally includes a result memory 180, a non-solid line classification unit 190 and a non-solid periodic line recreation unit 200. As described above in reference to FIG. 6, the deviation determination unit 161 determines the range and deviation of measured values in height and width of the non-solid line candidates. In addition, a distance between the components of the non-solid line candidates is examined for its range and deviation. The ratio determination unit 162 determines the ratio of a combination of the measured values in height, width and the element distance of the non-solid line candidates. The above determined values are stored in the result memory 180. The non-solid line classification unit 190 receives the stored values from the result memory 180 as well as the non-solid periodic line information from the non-solid periodic line unit 160.

Still referring to FIG. 12, the classification unit 190 classifies the non-solid periodic lines into a predetermined set of types such as a dotted line, a single chain line and a double chain line based upon the received information. For example, if the deviation for the height, width and distance are within a predetermined threshold range, the non-solid periodic line is determined as a dotted line. If non-solid periodic lines do not meet the above requirement, these non-solid lines are further processed for classification. Lastly, the second preferred embodiment includes the non-solid periodic line recreation unit such as a printer for generating a non-solid periodic line based upon the above determined classification.

Figure 13:
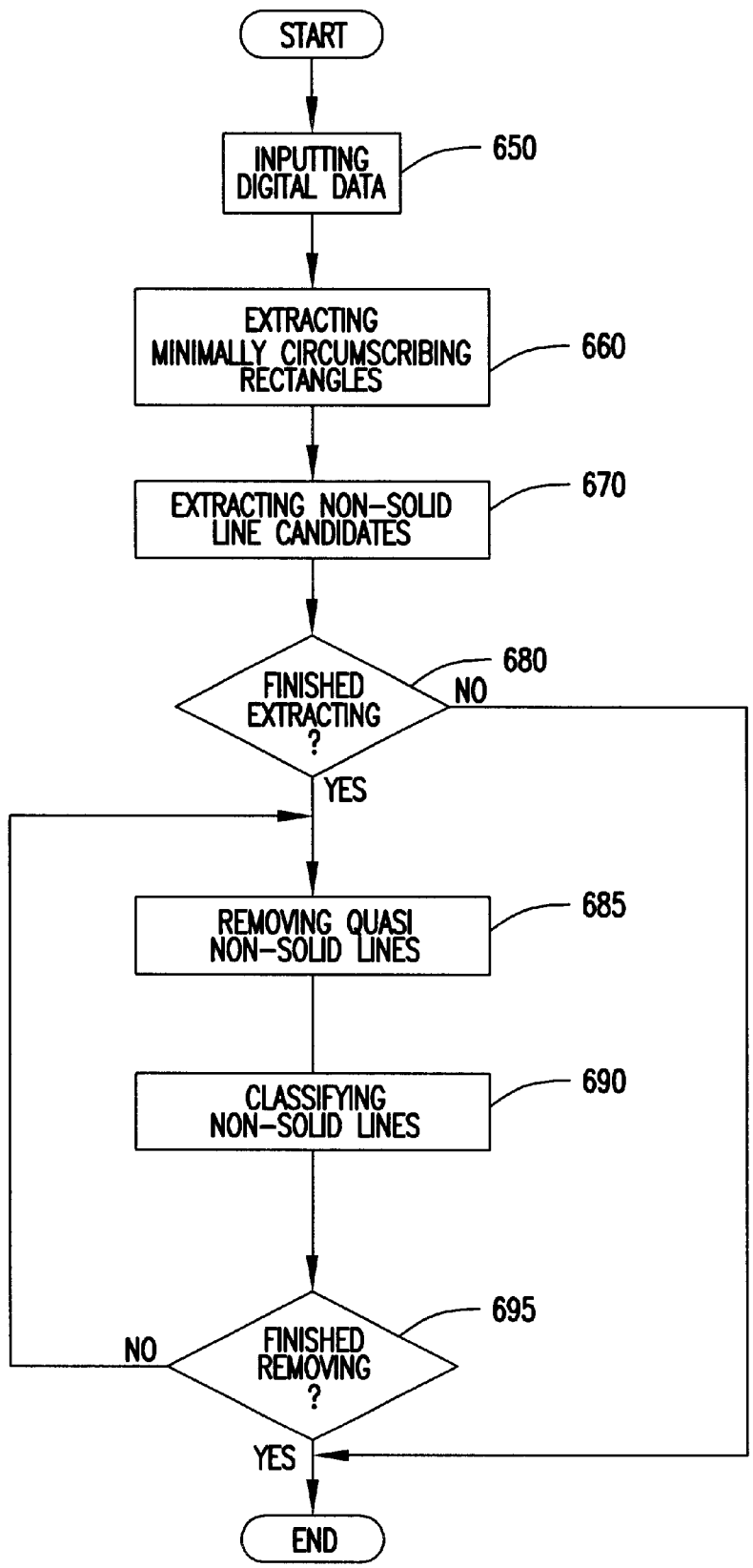
FIG. 13 is a flow chart illustrating steps involved in one preferred method of substantially eliminating erroneously recognized non-solid line candidates and further classifying non-solid periodic lines according to the current invention.

Now referring to FIG. 13, the steps involved in a preferred method of classifying non-solid periodic lines according to the current invention are illustrated in a flow chart. In a step 700, the distribution or deviation of the heights, the width and the distance between elements are determined for non-solid line candidates. Based upon the above information, it is determined whether the non-solid line candidates satisfy predetermined conditions for dotted lines in a step 720. For example, the predetermined conditions include that the deviation of the heights, the width and the distance between elements are each within a first predetermined threshold value. If the candidates determined to be dotted lines, they are now labeled as such for later identification in a step 730. On the other hand, the remaining non-solid candidates are now examined whether they satisfy a second set of predetermined conditions for either single chain lines or double chain lines. For example, the second set of the predetermined conditions includes that the deviation of the heights and the distance between elements are each within a second predetermined threshold value while the width is within a third predetermined threshold value. The third predetermined threshold value is larger than the second predetermined threshold value. Those non-solid line candidates that satisfy the second set of the predetermined conditions are now labeled as single/double chain line candidates in a step 750.

Referring to FIG. 13, a general flow for substantially eliminating erroneously recognized non-solid line candidates and subsequently classifying non-solid periodic lines in one preferred method according to the current invention is illustrated. In a step 650, digital data for text image is inputted. Areas containing a continuous line portion or a continuous character portion are extracted and each marked by a minimal circumscribing rectangle in a step 660. Based upon the minimal circumscribing rectangles, non-solid line candidates are selected in a step 670. When there are non-solid line candidates in a step 680, for each candidate, a process is performed to determine whether the candidate is erroneously selected non-solid line so that quasi non-solid lines are substantially eliminated in a step 685. Subsequently, non-solid periodic lines that are left after the step 685 are classified into a predetermined set of types. The above elimination steps 685 and 690 are repeated until all of the candidates are examined as shown in a step 695.

Figure 14:
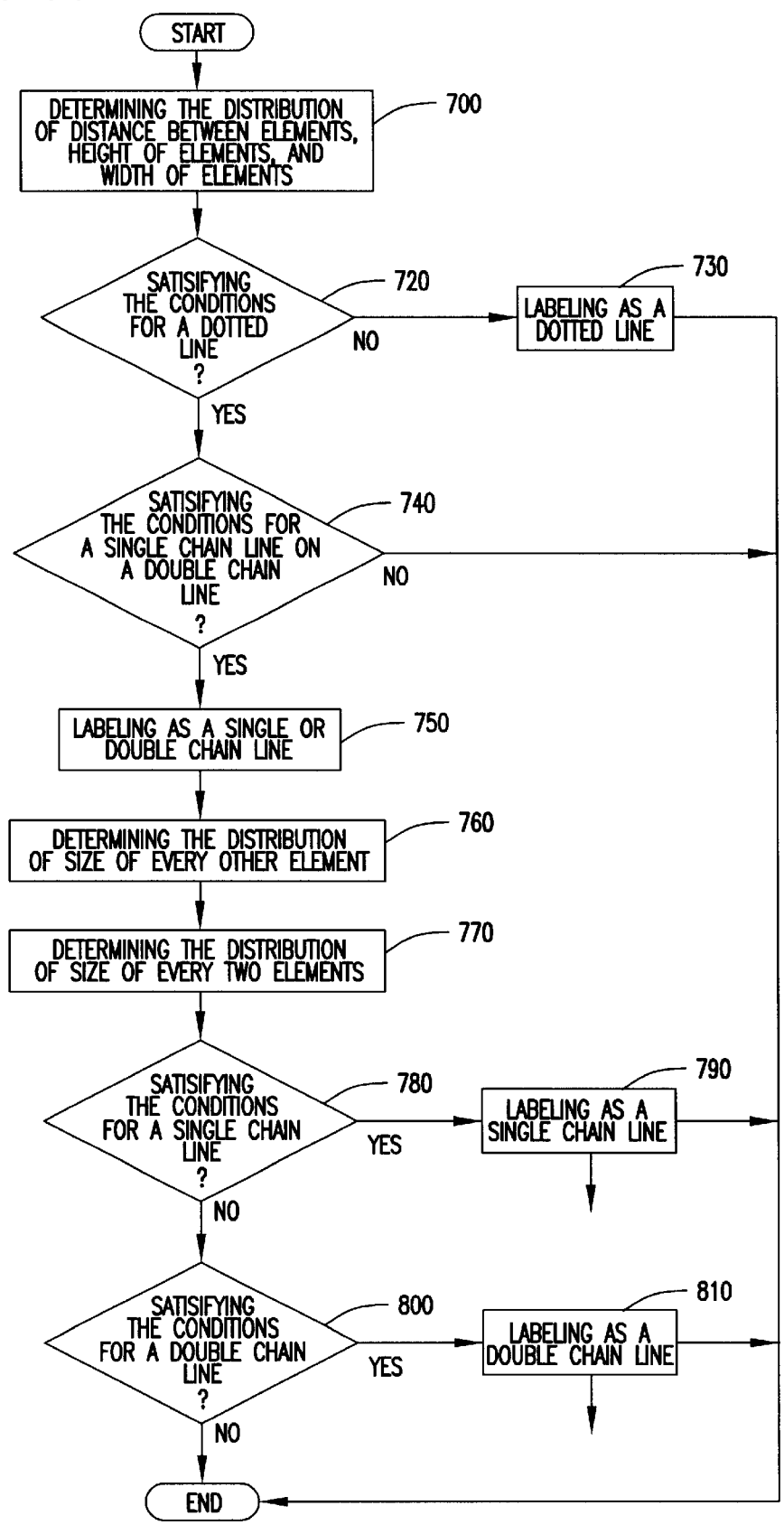
FIG. 14 is a flow chart further illustrating detailed steps involved in one preferred method of substantially eliminating erroneously recognized non-solid line candidates and further classifying non-solid periodic lines according to the current invention.

Still referring to FIG. 14, to further classify the single/double chain line candidates into a single chain type and a double chain type, every other element A is isolated for each line candidate in a step 760 while every two element B is isolated in a step 770. Based upon the above information, it is determined whether each of the single/double chain line candidates satisfies a third set of predetermined conditions. For example, the third set of the predetermined conditions includes that the deviation of the every other element A is smaller than that of the every two element B. If the candidates are determined to be single chain lines, they are now labeled as such for later identification in a step 790. On the other hand, the remaining candidates are now examined whether they satisfy a fourth set of predetermined conditions for double chain lines in a step 800. Similarly, if the candidates are determined to be double chain lines, they are now labeled as such for later identification in a step 810.

Figure 15:
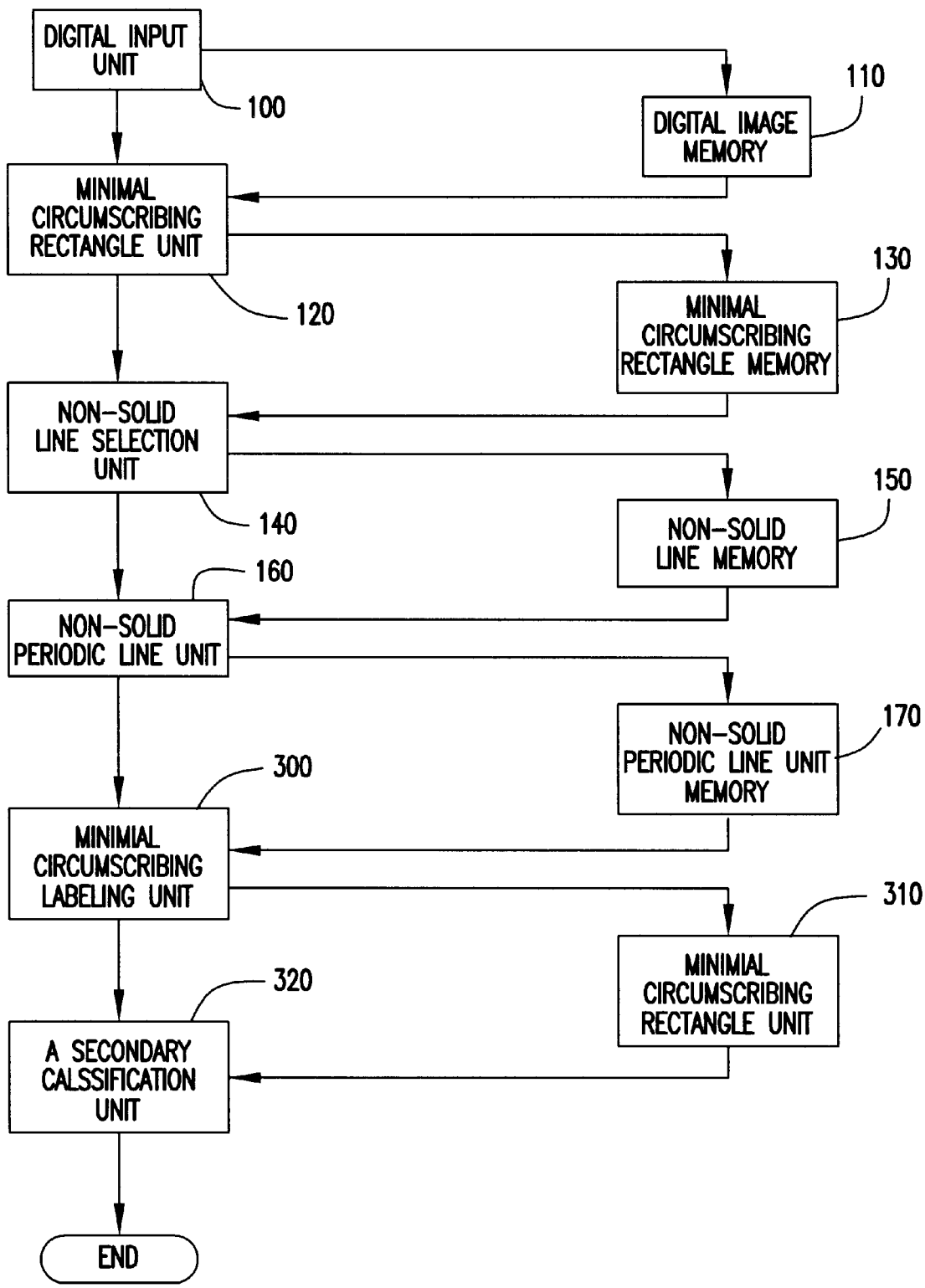
FIG. 15 is a block diagram illustrating a fourth preferred embodiment of the system for substantially eliminating erroneously recognized non-solid line candidates and subsequently labeling non-solid periodic lines according to the current invention.

Now referring to FIG. 15, a fourth embodiment of the system for substantially eliminating erroneously recognized non-solid line according to the current invention includes units which are generally identical to the ones already described in reference to FIG. 6. However, the fourth preferred embodiment additionally includes a minimal circumscribing labeling unit 300, a minimal circumscribing rectangle unit 310 and a secondary classification unit 320. After the non-solid periodic line unit 160 selects non-solid periodic lines and stores them in the non-solid periodic line memory 170, the minimal circumscribing labeling unit 300 labels the non-solid periodic lines for later identification and stores label information in the minimal circumscribing rectangle unit 310. For example, the label information includes the location of the minimal circumscribing rectangles and a type of the non-solid periodic line. Based upon the stored information, the labeled non-solid periodic lines are later immediately identified without duplicating the identification process. Lastly, the secondary classification unit 320 further processes or classifies the non-solid periodic lines partially based on the labeled information stored in the minimal circumscribing rectangle unit 310.

Figure 16:
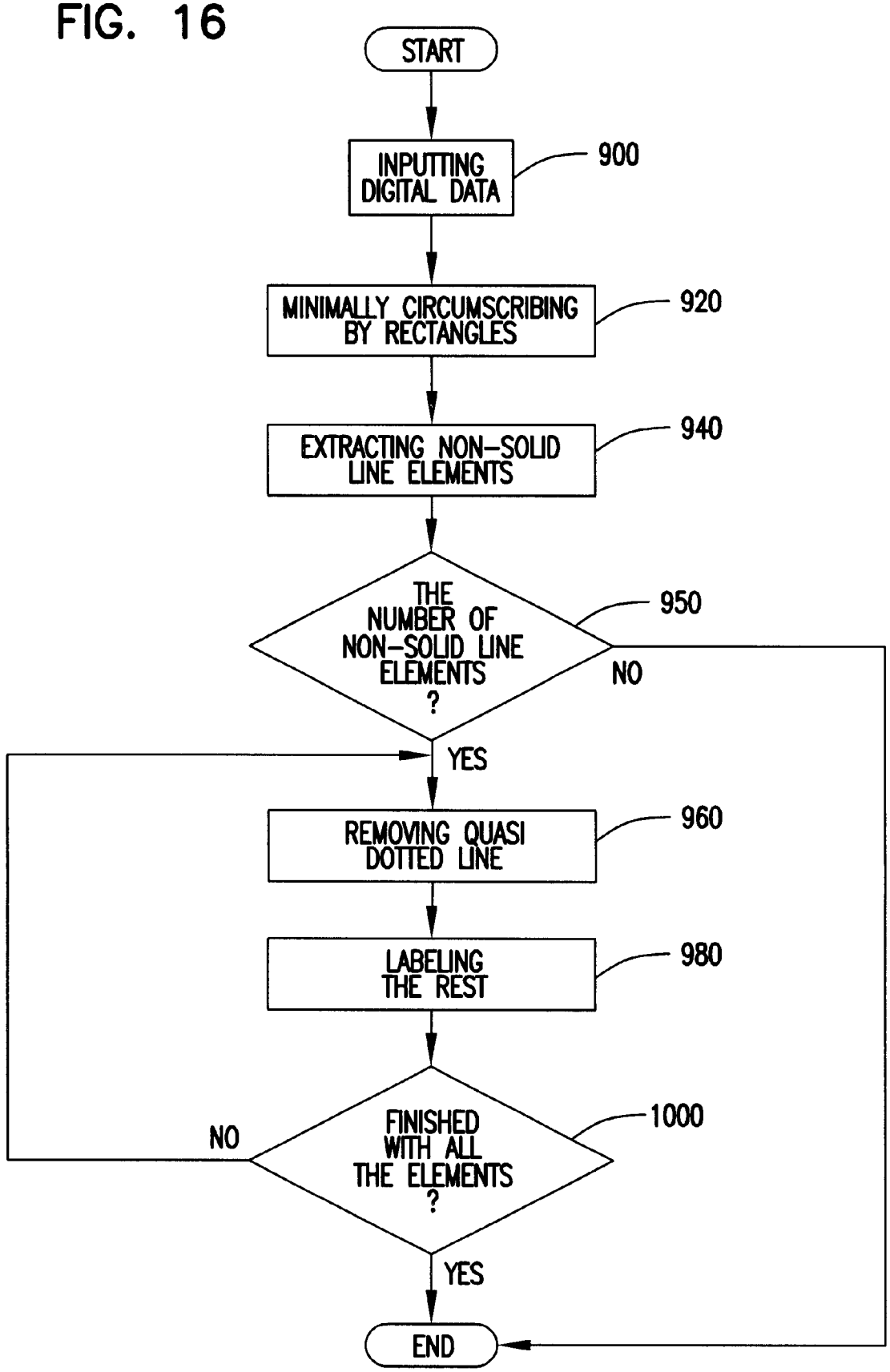
FIG. 16 is a flow chart illustrating steps involved in one preferred method of substantially eliminating erroneously recognized non-solid line candidates and subsequently labeling non-solid periodic lines according to the current invention.

Referring to FIG. 16, the steps involved in a preferred method of labeling non-solid solid periodic lines according to the current invention are illustrated in a flow chart. In a step 700, digital data is inputted, and continuous lines and character portions are minimally circumscribed by rectangles in a step 920. Non-solid line elements or candidates are identified in a step 940. The following steps are performed for each of the candidates if the candidates exist as confirmed in a step 950: In a step 960, erroneously recognized non-solid line candidates are removed, and the non-solid periodic lines are labeled in a step 980. The label information includes the location of the minimal circumscribing rectangles and a type of the non-solid periodic line. These steps are repeated until every candidate is finished as checked in a step 1000. As an alternative method of labeling non-solid periodic lines according to the current invention, instead of or additional to labeling non-solid periodic lines, the erroneously recognized non-solid line candidates are label for later identification.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of determining non-solid periodic line, comprising the steps of:
   a) inputting image data including continuous elements;
   b) determining circumscribing areas each enclosing a continuous element;
   c) selecting candidates for a non-solid line having one of predetermined periodic patterns based upon the circumscribing areas; and
   d) eliminating one of the candidates based upon a predetermined relation of a corresponding one of the circumsribing areas to others of the circumscribing areas containing text characters adjacent to the one of the candicates.

2. The method of determining non-solid periodic line according to claim 1 wherein said step c) selects said candidates in a vertical direction.

3. The method of determining non-solid periodic line according to claim 1 wherein said predetermined periodic patterns include a single chain line and a double chain line.

4. The method of determining non-solid periodic line according to claim 3 further comprising an additional step e) of classifying said remaining candidates after said step d) into said single chain line and said double chain line.

5. The method of determining non-solid periodic line according to claim 1 wherein said predetermined relation is a minimally necessary distance to said adjacent circumscribing areas containing text characters.

6. The method of determining non-solid periodic line according to claim 5 wherein said minimally necessary distance is horizontal to said adjacent circumscribing areas.

7. The method of determining non-solid periodic line according to claim 1 further comprising an additional step f) of labeling remaining candidates as non-solid periodic lines.

8. The method of determining non-solid periodic line according to claim 1 where said step d) further including an additional step g) of eliminating some of the candidates based upon other predetermined relations of circumscribing areas.

9. The method of determining non-solid periodic line according to claim 8 where said other predetermined relations include a distribution of height, width and distance of the circumscribing areas.

10. The method of determining non-solid periodic line according to claim 8 where said other predetermined relations include a ratio of height, width and distance of the circumscribing areas.

11. The method of determining non-solid periodic line according to claim 8 where said other predetermined relations include a ratio of on and off pixels in the circumscribing areas.

12. A system for determining non-solid periodic line, comprising:
   an input unit for inputting image data including continuous elements;
   a circumscribing unit operationally connected to said input unit for determining circumscribing areas each enclosing a continuous element;
   a non-solid line selection unit operationally connected to said circumscribing unit for selecting candidates for a non-solid line having one of predetermined periodic patterns based upon the circumscribing areas; and
   a non-solid periodic line unit operationally connected to said non-solid line selection unit for eliminating one of the candidates based upon a predetermined relation of a corresponding one of the circumscribing areas to others of the circumscribing areas containing text characters adjacent to the one of the candidates.

13. The system for determining non-solid periodic line according to claim 12 wherein said non-solid line selection unit determines said candidates in a vertical direction.

14. The system for determining non-solid periodic line according to claim 12 wherein said predetermined periodic patterns include a single chain line and a double chain line.

15. The system for determining non-solid periodic line according to claim 14 wherein said non-solid line selection unit further classifies said remaining candidates into said single chain line and said double chain line.

16. The system for determining non-solid periodic line according to claim 12 wherein said non-solid periodic line unit eliminates some of the candidates based upon a minimally necessary distance to said adjacent circumscribing areas containing text characters.

17. The system for determining non-solid periodic line according to claim 16 wherein said minimally necessary distance is a horizontal distance to said adjacent circumscribing areas.

18. The system for determining non-solid periodic line according to claim 12 further comprises a labeling unit operationally connected to said non-solid periodic line unit for labeling remaining candidates as non-solid periodic lines.

19. The system for determining non-solid periodic line according to claim 12 wherein said non-solid periodic line unit further eliminates some of the candidates based upon other predetermined relations of circumscribing areas.

20. The system for determining non-solid periodic line according to claim 19 where said other predetermined relations include a distribution of height, width and distance of the circumscribing areas.

21. The system for determining non-solid periodic line according to claim 19 where said other predetermined relations include a ratio of height, width and distance of the circumscribing areas.

22. The system for determining non-solid periodic line according to claim 19 where said other predetermined relations include a ration of on and off pixels in the circumscribing areas.

23. A computer program stored on a medium for executing computer instructions so as to determine non-solid periodic line in text image data, the computer program performing the steps of:

e) inputting the text image data including continuous elements;

f) determining circumscribing areas each enclosing a continuous element;

g) selecting candidates for a non-solid line having one of predetermined periodic patterns based upon the circumscribing areas; and h) eliminating one of the candidates based upon a predetermined relation of a corresponding one of the circumscribing areas to others of the circumscribing areas containing text characters adjacent to the one of the candidates.

* * * * *